W. P. QUENTELL.
CALCULATING MACHINE.
APPLICATION FILED FEB. 24, 1914.
1,104,385.
Patented July 21, 1914.
5 SHEETS—SHEET 2.
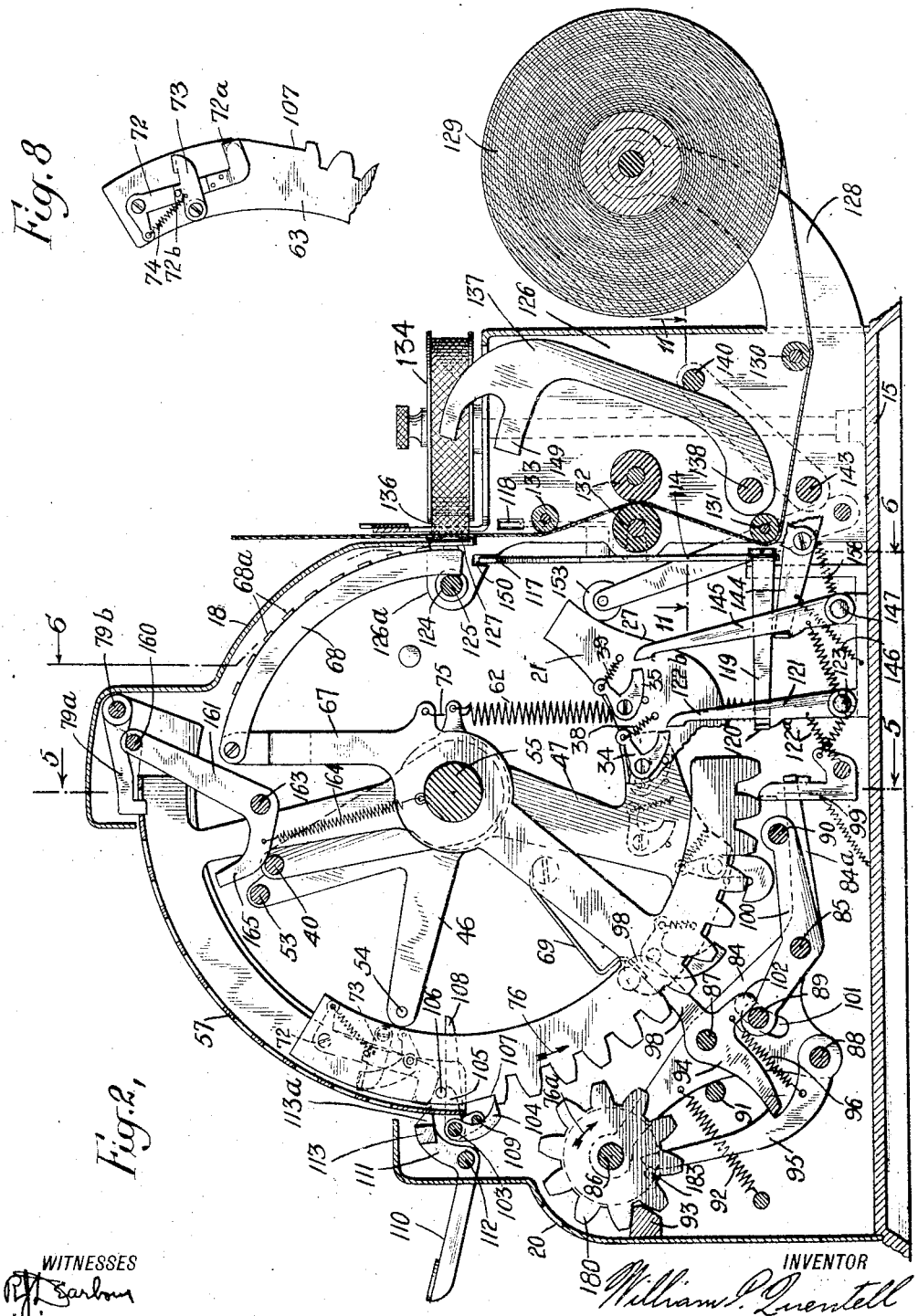

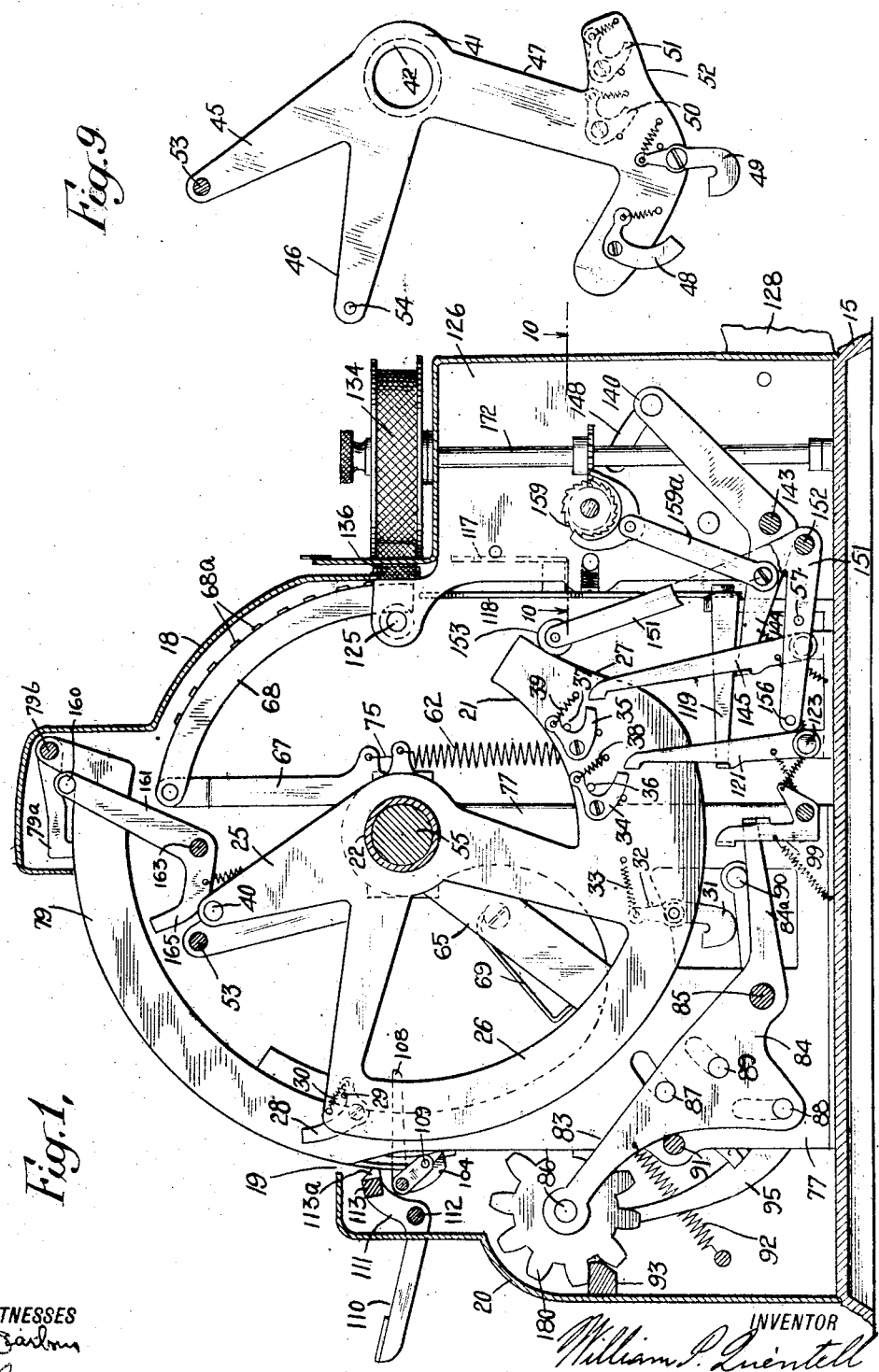

W. P. QUENTELL.
CALCULATING MACHINE.
APPLICATION FILED FEB. 24, 1914.
1,104,385.
Patented July 21, 1914.
5 SHEETS—SHEET 3.
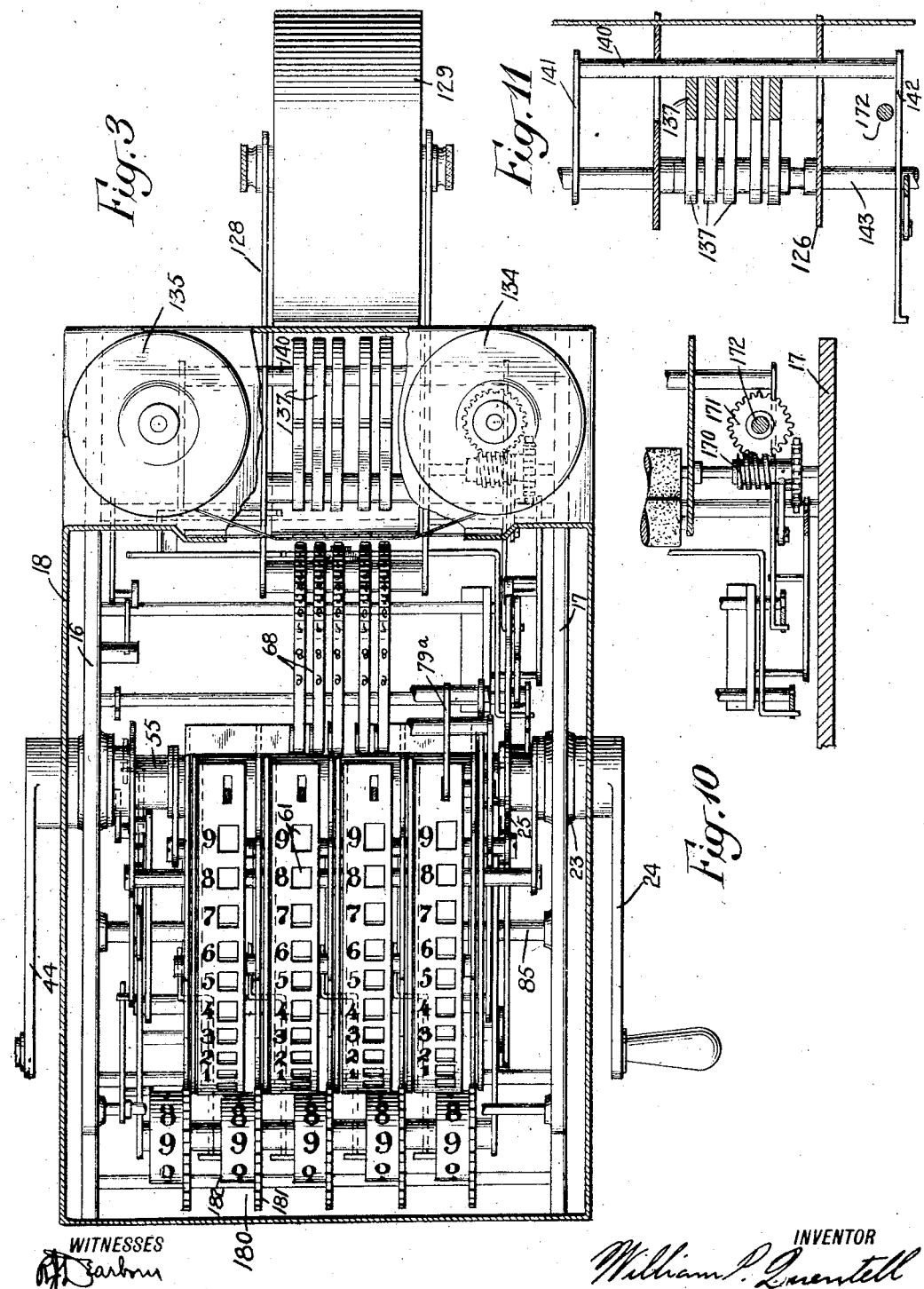

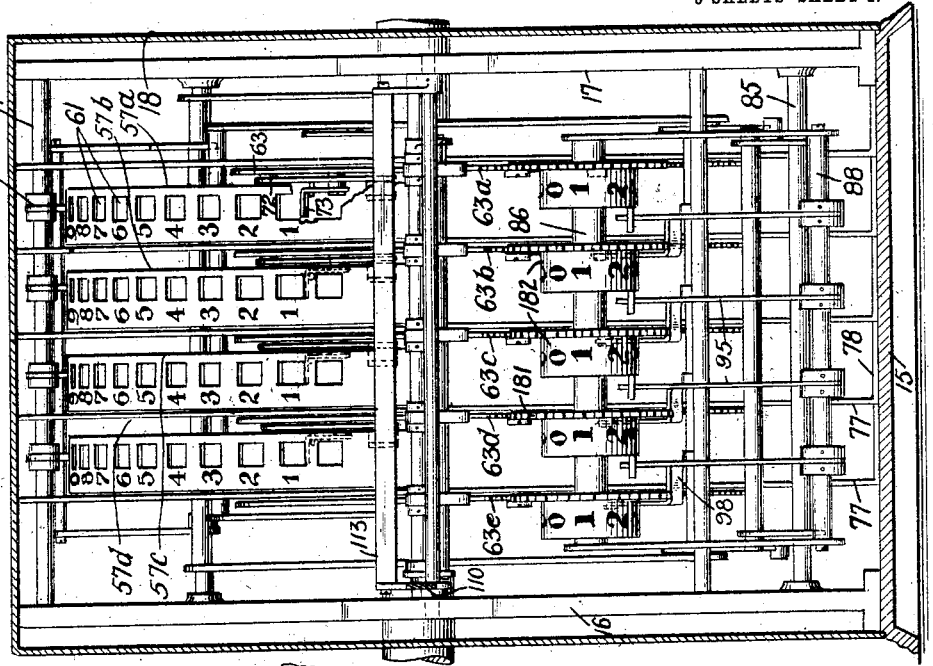

W. P. QUENTELL.
CALCULATING MACHINE.
APPLICATION FILED FEB. 24, 1914.
1,104,385.
Patented July 21, 1914.
5 SHEETS—SHEET 5.
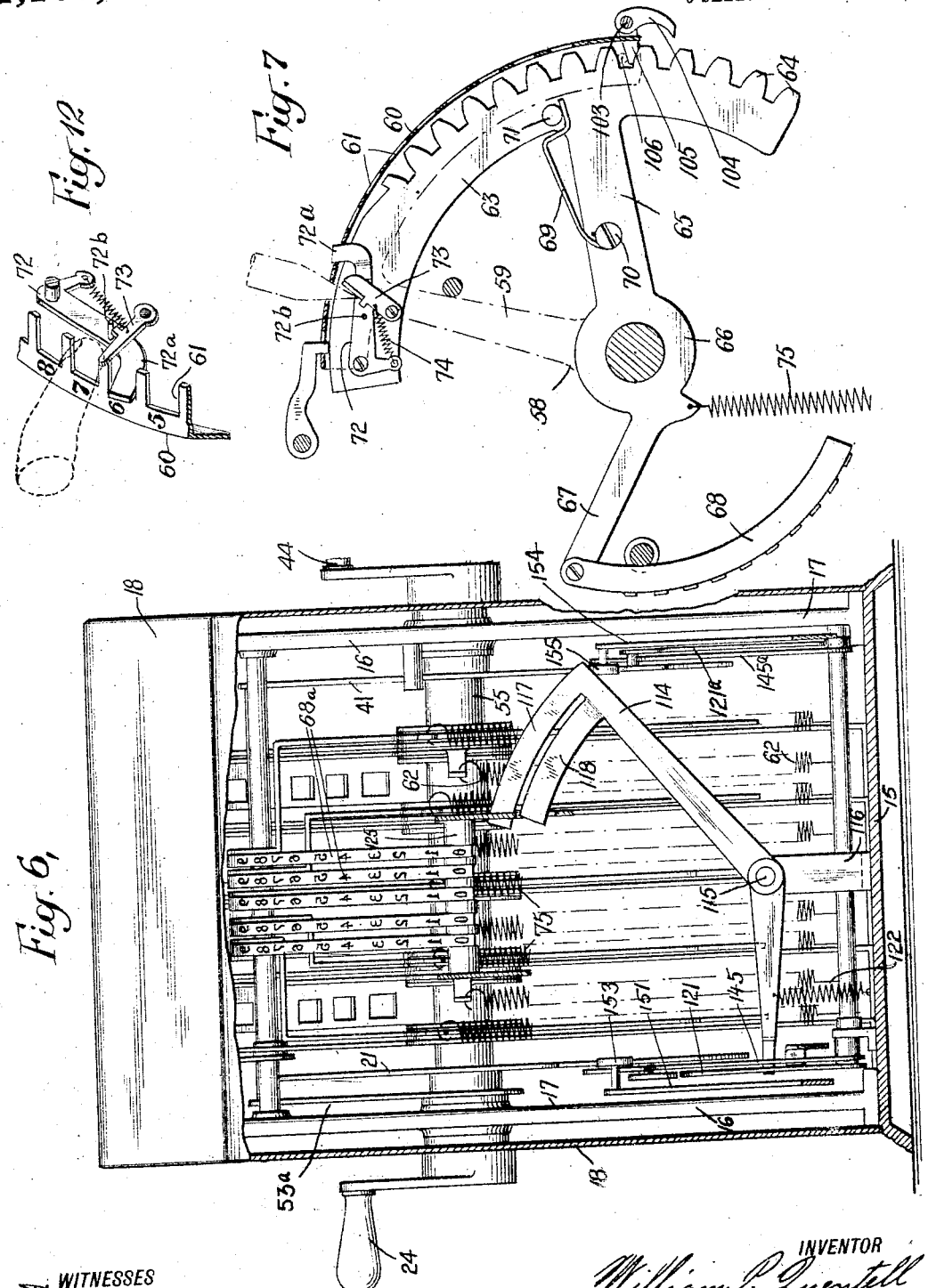

UNITED STATES PATENT OFFICE.

WILLIAM P. QUENTELL, OF MONTCLAIR, NEW JERSEY.

CALCULATING-MACHINE.

1,104,385.  Specification of Letters Patent.  Patented July 21, 1914.

Application filed February 24, 1914. Serial No. 820,615.

*To all whom it may concern:*

Be it known that I, WILLIAM P. QUENTELL, a citizen of the United States of America, and a resident of Montclair, Essex county, and State of New Jersey, have invented certain new and useful Improvements in Calculating-Machines, of which the following is a specification, reference being had to the accompanying drawings, forming a part thereof.

My invention relates to calculating machines, and has special reference to machines of the "no key-board type" which are designed to add, register, and record numbers; to indicate the total of all the numbers registered in the machine and to record the total as a footing to the items previously recorded.

One object of my invention is to provide a machine of the aforesaid character which shall be simple and relatively inexpensive in construction and accurate and positive in operation.

Another object is to provide simple and particularly advantageous index members and adding members, and means for governing the movement and determining the adjustments of the index members to set up the desired items on the machine.

Other objects and advantages of my invention will be set forth hereinafter, and in order that my invention may be thoroughly understood, I will proceed to describe the same in the following specification and then point out the novel features thereof in appended claims.

In the drawings: Figure 1 is an end elevation, with the casing broken away and shown in section, of a calculating machine embodying my invention. Fig. 2 is a view corresponding to Fig. 1 except that the operating member is broken away to show the index segments and other interior parts of the machine. Fig. 3 is a plan view of the same machine with the cover broken away, to show the type hammers as well as the parts of the registering mechanism. Fig. 4 is a front view of the machine with the cover broken away. Figs. 5 and 6 are sectional elevations looking from the rear of the machine and taken respectively on the lines 5—5 and 6—6 of Fig. 2. Fig. 7 is a detail view of one of the actuating segments looking from the left-hand end of the machine and illustrating the method of releasing the lock which holds the segment in position to record a desired item. The upper portion of the same segment is shown in Fig. 8 with the lock latched in its retracted position. Fig. 9 is a detail view of the totalizer member and its attached parts. Figs. 10 and 11 are sectional views taken respectively on the lines 10—10 of Fig. 1 and 11—11 of Fig. 2. A slightly modified form of my invention is shown in Fig. 12 which is a perspective detail of a portion of an index segment.

The machine illustrated in Figs. 1 to 11 inclusive of the drawings comprises in general, a casing, an operating member 21, a totalizer member 41, a horizontal shaft 55, index segments $57^a$, $57^b$, etc., adding wheel actuating segments $63^a$, $63^b$, etc., spacers 77, an oscillating frame 83 supporting adding wheels 180 and a carrying mechanism, type carriers 68, type hammers 137, a shutter 114, and a reset mechanism for the shutter and type hammers. Each of the foregoing will now be described in a separate section.

*Casing.*—The casing comprises a base 15 (Fig. 4) having end brackets 16 and 17 secured thereto and extending upwardly therefrom and a cover 18 which is preferably formed of pressed steel, and has an open front exposing the index segments and apertures 20 through which are exhibited the totals indicated on the adding wheels.

*Operating member.*—The operating member 21 (see Figs. 1 and 3) controls the resetting of the carrying mechanism, the moving of the adding wheels into and out of mesh with the adding wheel actuating segments, the mechanism for preventing the printing of the type to the left of the highest column registered, the printing hammers and the adding wheel actuating segments. It has a hub 22 which extends outwardly through a bearing 23 in the end bracket 17 and thus provides a rotatable mounting for the member. The hub also extends through the end wall of the cover 18 and has secured to its outer end an operating handle lever 24. The body of the member 21 is flat and is shaped to form an arm 25 and a segment 26 which terminates in a cam edge surface 27. Pivotally secured to the member at one end of the segment 26 is a pawl 28, held against a pin stop 29 by a spring 30; and adjacent to the cam surface 27 are a pair of similar pawls 34 and 35 which are likewise held against stops 36 and 37 by springs 38 and 39. The arm 25 supports a transverse bail 40 which is suitably supported at its opposite end by a radial arm 40ª mounted to rotate on the shaft 55.

*Totalizer member.*—The totalizer member 41 (see Figs. 3, 5 and 9) controls the mechanism for printing the total of the items added and it resembles the operating member, but is located at the opposite end of the machine. It has a hollow hub 42 extending through a supporting bearing 43 in the bracket 16 and through the end of the cover, a handle lever 44 being secured to its outer end. The member 41 has three radial arms 45, 46, and 47; the arm 47 being T-shaped and provided with spring-pressed pawls 48, 49, 50 and 51 which correspond to the pawls 28, 31, 34 and 35 of the operating member 21. The arm 47 has a cam edge surface 52 corresponding to the surface 27 of the operating member. The arm 45 supports a bale 53 which corresponds to the bail 40 of the member 21 and is supported at one end by an arm 53ª mounted on the hub 22. A pin 54 projects laterally from the end of the arm 46.

*Horizontal shaft.*—The horizontal shaft 55 as clearly shown in Fig. 5, is supported indirectly by the bearings 23 and 43, its ends being fitted freely into the hubs 22 and 42 and constituting inside bearings for the members 21 and 41. It also constitutes a bearing for each of the adding wheel actuating segments and the index segments. Pins 56 prevent a longitudinal movement of the shaft and thus hold it in place.

*Index segments.*—The index segments 57ª, 57ᵇ, 57ᶜ and 57ᵈ are similar and are uniformly spaced on the shaft 55. They limit the movement of the adding wheel actuating segments to correspond with the value of the number to be added and recorded, the latch carried on the actuating segment being locked into the selected aperture of the index member. Each of them comprises a hub 58, a radial arm 59 and a cylindrical curved flange 60 in which are a series of apertures 61 numbered 1, 2, etc., as shown in Figs. 3 and 4. Each segment has a spring 62 which tends to hold it in an elevated position against a stationary shaft 103 or other suitable stop as hereinafter explained.

*Actuating segments.*—The adding wheel actuating segments 63ª, 63ᵇ, etc., (see Figs. 2 and 7) are alike except that the segment 63ª is not provided with as many attachments because there is no index segment with which it coöperates, while the others respectively coöperate with the index segments 57ª, 57ᵇ, etc. Each actuating segment has a toothed periphery 64, adapted to mesh with the teeth of the adding wheels as explained below, a radial arm 65, a hub 66, and a type arm 67. One of the type carriers 68 is pivotally secured to and depends from the outer end of each of the arms 67. As clearly shown in Fig. 6 these arms are offset to throw the type carriers, which are near the rear of the machine, close together and to give them a suitable spacing. A spring 69 is secured to the radial arm 65 by a screw 70 and extends beyond the edge of the arm in a substantially radial line. Its outer end is in engagement with a stop 71 which holds the spring under tension. Pivoted near the upper end of the segment is a locking pawl 72 which is normally held in its retracted position by the engagement of a latch 73 with a pin 72ᵇ, a single spring 74 tending both to move the lock outwardly into the position shown in Fig. 7 and to hold the latch in its locked position. A spring 75 tends to move each segment in a direction opposite to the arrow 76 of Fig. 2. Each of the locks 72 has an offset branch 72ª which engages the aperture 61 while its end is rounded and extends beyond the surface of the index segments to coöperate with the cam surfaces 113ª. Near the lower ends of the index segments and extending transversely of the machine, is a shaft 103 to which is secured a plurality of latches 104. Each latch has a releasing arm 105 which is adapted to be actuated by a lateral pin projection 106 with which each of the index segments is provided. Each of the latches 104 is normally held in engagement with a notch 107 in one of the actuating segments 63. All of the latches may be concurrently released by means of a bell crank releasing lever 108 which is adapted to actuate a transverse bail 109. The repeater, as clearly shown in Figs. 1, 2 and 4, comprises a pair of lever arms 111 which are secured to a pivot pin 112 and are interconnected by a transverse rod 113. One of the levers 111 has an outwardly extending key 110 which may be pressed down by the finger of the operator for multiplying any number which has been set up as explained below. The actuating segments are moved while out of mesh with the adding wheels, to predetermined positions on the index members of the same columns and are then locked by the engagement of their latches with the openings of the index members. Then the adding wheels are brought into mesh with the actuating segments and moved by the latter, the distance corresponding to the value of the number selected on the index members.

*Spacers.*—As clearly shown in Fig. 5, the adding wheel actuating segments and the index segments, with which they respectively coöperate, are rotatively mounted on the shaft 55 in adjacent groups. Their relative positions are maintained by spacers 77 (see Figs. 1, 4 and 5). The spacers are similar to each other and each comprises a foot 78 which is bent at right angles to the body, rests upon the base 15, and determines the distance between the spacers. Part of each spacer is formed into an arc 79 which is adjacent to the segment 57 and has its center of curvature coincident with the axis of the shaft 55. A latch 79 is pivotally mounted at the upper end of each of the spacer arcs 79 in any suitable manner as, for example, on a pivot shaft 79ᵇ. Each spacer is also provided with a central hub 80 which is interposed between the hubs of an index segment 57 and an adding wheel actuating segment 63. The hub 80 of the spacer is provided with hub projections 81 and 82 which are formed integral with the central hub 80 and are respectively folded over the aforesaid adjacent hubs. The arrangement of parts is such that the overlapping hubs of the spacer hold the other segments in position without interfering with the limited rotative movement of each segment, which is all that is required for operating the machine. The latches 79ᵃ are arranged to be concurrently released by a releasing bail 160 which is carried at the outer end of a pair of spaced arms 161 and 162, and is arranged to be swung about a shaft 163 as a pivot. The bail 160 is actuated to release the latches 79ᵃ by a spring 164. It is curved into a retracted position and normally held in this position as shown in Fig. 2, by the bail 40 which acts upon a cam extension 165 of the arm 161.

*Oscillating frame.*—The oscillating frame 83 (see Fig. 1) carries the adding wheels and comprises a pair of end rockers 84 which are pivotally mounted on a stationary transverse shaft 85 and are located near the respective ends of the machine; a shaft 86 on which the adding wheels are rotatively mounted, and a plurality of shafts 87, 88, 89 and 90. Each of the adding wheels 180 comprises a toothed gear wheel 181, an index drum 182 numbered 0, 1, 2, etc., and a pin 183 which is adapted to actuate the carrying mechanism. A stationary shaft 91 serves as a stop against which the frame is held by a spring 92 except when the adding wheels are thrown into mesh with their actuating segments. A stationary shaft 93 is arranged to engage a tooth slot of each of the adding wheels when the frame is against the stop 91, for the purpose of preventing the wheels from being turned when in this position.

*Carrying mechanism.*—The carrying mechanism for carrying the decimal from the lower to the higher column at the complete rotation of the adding wheel of the lower column, is as follows: Pivotally mounted on the shaft 87 are a plurality of stop levers 94, each of which is held in its retracted position by a latch 95, a single spring 96 tending to hold the latch in its locked position and to release the stop lever. The latches 95 are pivotally mounted on the shaft 88 and each is adapted to be tripped as hereinafter explained more fully, by a pin projection 183 of the adding wheel with which it coöperates. Each stop lever has an offset arm 98 (see Fig. 5) which, when the lever is set, extends toward the shaft 55 into a position to be engaged by the pin projection 71 of the actuating segment 63 of the adjacent higher column. A latch 99 is arranged to hold the frame 83 so that the adding wheels mesh with the teeth of the actuating segments, when once it has been adjusted to this position.

*Reset frame.*—The reset frame is for resetting the carrying mechanism to operative position after having carried. It also moves the adding wheel carrying frame into position to engage the wheels with their actuating segments. The shafts 89 and 90 form parts of a reset frame (see Fig. 2) comprising levers 100 which are pivoted on the shaft 85 near opposite ends of the machine and are joined at corresponding ends by the shafts. The shaft 90 extends above projections 84ᴬ of the end rockers 84 and the shaft 89 extends through slots 101 therein. The parts are so arranged that the reset frame when actuated, not only swings the oscillating frame 83 as a whole, upon its pivot 85, but also by reason of the engagement of the shaft 89 with projections 102 resets such stop levers as have been tripped.

*Type carriers.*—The type carriers 68 which are in the form of circumferentially curved strips mounted on edge, are guided by a series of annular grooves 124 in a guide shaft 125. This shaft is substantially parallel to the shaft 55 and is supported in the back central portion of the machine by stationary spaced lugs 126ᵃ which are parts of a pair of stationary uprights 126. The type carriers are beyond the shaft and each of them has secured to its outer edge a series of suitable type 68ᵃ (see Figs. 2 and 6). The cover 18 is broken away at 127 opposite to the zero type when the machine occupies its zero position. Below this point the casing is extended backwardly to make room for the hammers and the actuating mechanism therefor. Beyond this casing extension, supported by the bracket 128, is a paper roll 129, a strip of paper being led from the roll under guide rolls 130 and 131, through a pair of feed rolls 132, over guide roll 133, and upwardly passed the opening 127 in the body of the cover. The feed rolls for the paper are actuated in the usual manner by a pawl and ratchet 159 which mechanism is operatively connected to the arm 144 by a link 159ᵃ. Above the casing extension on vertical shafts 172, is a pair of ribbon rolls 134, 135, a ribbon 136 extending from one roll to the other between the strip of paper and the opening 127.

*Type hammers.*—The type hammers 137 are mounted on a pivot shaft 138 which is substantially parallel to the shaft 55. They are spaced apart as is clearly shown in Fig. 3, to correspond to the spacing of the type carriers and each of them is in the plane of the carrier to which it corresponds. The hammers are actuated by a bail 140 which is supported by levers 141 and 142 and against which the hammers rest as shown in Figs. 2 and 11. The levers are secured to a pivot 143 and the lever 142 has an extension 144 which may be engaged by a latch 145. A spring 146 tends to move the bail 140 so as to actuate the hammers and consequently the hammers are actuated whenever the latch 145 is released. This latch extends upwardly as shown in Figs. 1 and 2 and is adapted to be actuated by the pawl 35 of the member 21. As hereinafter explained it may also be tripped by the pawl 51 of the member 41, the latch being secured to a pivot shaft 147, and a correspondingly located arm 145ª being found at the opposite end of the machine. The bail 140 extends through slots 148 in the partition walls of the casing extension, the arrangement being such that the hammers are not carried all the way but are merely actuated by the bail, their momentum being sufficient to carry their striking ends against the strip of paper which, together with the ribbon 136, is carried against the type, the imprint of the type being left on the paper in a well known manner.

*Shutter.*—The shutter 114 (see Fig. 6) which prevents the printing of the type to the left of the highest column to be printed is in the form of a bell crank lever and is pivoted at 115 on a stationary bracket 116. It is located near the back of the machine and is mounted to swing in a vertical plane which is substantially parallel to the shaft 55. Extending circumferentially from the outer end of one of the arms of the shutter is a pair of parallel fingers 117, 118, the finger 118 being offset as shown in Fig. 2. The extremity of the other arm is considerably offset forming a section 119 at right angles to the body of the shutter. A projection 120 at right angles to the section 119 is adapted to be engaged by a latch 121 which holds the shutter in a retracted position in opposition to a spring 122. The latch 121 is retracted by a spring 122ª and has an extension 122ᵇ and is arranged to be released as hereafter explained, by the pawl 34 of the member 21. In fact, the latch is secured to a pivot pin 123, near the opposite end of which, is an arm 121ª which is arranged to be actuated by the pawl 50 of the totalizer member 41. The striker on the end of the hammer is bifurcated as shown in Fig. 2, the lower arm 149 being adapted to engage the offset finger 118 of the shutter under predetermined conditions as explained below. Only those hammers which are not stopped by the shutter are active in printing. Attention is directed to the fact that the finger 117 of the shutter moves through a guide notch 150 and crosses the path of movement of the type carriers. If the type carriers are set to print zero, they do not extend into the path of the shutter but otherwise they do, and consequently the motion of the shutter in each case is determined by the highest digit of which the number, set up in the machine, is comprised. As explained below this prevents the printing of zeros ahead of the number set up.

*Reset for shutter hammers.*—The reset for the shutter and for the hammers comprises a bell crank lever 151 secured to one end of a pivot pin 152 and provided with a roller 153 which coöperates with the cam surface 27 of the member 21. At the opposite end of the pin 152 is affixed an arm 154 having a roller 155 which coöperates with the cam surface 52 of the member 41. The lower arm of the bell crank lever 151 is provided with laterally projecting pins 156 and 157 which respectively coöperate in resetting, with the arms 119 and 144. The reset lever 151 may be retracted by a spring 158. On the shaft of one of the paper rolls is a worm gear 170 which meshes with a gear wheel 171 mounted on the ribbon roll shaft 172.

The operation of my invention is as follows:—assuming that it is first desired to set up the number "78" in the machine, a pencil or stylus is inserted in the aperture 61 of the index segment 57ª which is numbered "8," this segment corresponding to the units column. A slight downward movement is imparted by the stylus to the segment. This movement is limited by the latch 79ª as clearly shown in Fig. 2. As a result of this movement the pin 106 acts upon the arm 105 and releases the latch 104 from the notch 107 of the actuating segment 63ª. When released this segment is immediately moved upwardly by its spring 75 until as shown in Fig. 7, the latch 73 comes into engagement with the pencil or stylus and releases the lock 72, permitting its extremity 72ª to engage with the aperture 61 next below that in which the pencil or stylus is inserted. This action takes place very quickly and the pencil or stylus may be withdrawn immediately. In like manner the pencil or stylus is next inserted in the aperture 61 opposite the figure "7" of the index segment 57ᵇ which corresponds to the tens column. The actuating segments 63ª and 63ᵇ are thus locked in positions to register the numbers chosen, on the adding wheels as explained below. The operator then pulls down on the actuating handle lever 24 and as a result a rotative movement is imparted to the actuating member 21.

The latch 121 is first tripped by the pawl 34 and shortly afterward the latch 145 is tripped by the pawl 35 and the pawl 31 acts as a cam, pressing down the shaft 90 and thereby causing an oscillation of the adding wheel frame 83. The spring 122 produces a rotative movement of the shutter 114 as soon as the latch 121 is released. The movement of the shutter is arrested by the first depressed type carrier which is in the path of the finger 117. In the example assumed this is the type carrier 68 which corresponds to the tens column. The finger 118 is slightly shorter than the finger 117 but long enough to arrest the type hammers corresponding to the hundreds and other higher columns. The releasing of the latch 145, after the setting of the shutter, releases the bail 140 which, by reason of the action of the spring 146, actuates the hammers 137. The number "78" which was thus set up, is thus printed on the strip of paper as already explained. A further movement of the actuating member 21 rocks the bell crank lever 151 by reason of the coöperation between the cam surface 27 and the roller 153. The pins 156 and 157 carried by the lower arm of the bell crank lever 151, engage the arms 119 and 144 and reset the shutter and the hammer bail. These parts are immediately latched in their reset positions since the latches 121 and 145 are both spring-pressed. The oscillation of the frame 83 produced as above indicated by the engagement of the pawl 31 and the shaft 90, throws the adding wheels into mesh with the actuating segments of the same column there being an adding wheel and a segment for each column as already explained.

It will of course be understood that the adding wheels are thrown into mesh with the segments while the segments are in the positions to which they have been set, the tens and units segments being set at "78" in the example assumed. The adding wheels are locked in their engaging position by the latch 99 acting on the arm 84ᵃ.

The first downward movement of the bail 40 permits the spring 164 to swing the bail 160 about its pivot 163 and thus release all of the latches 79ᵃ. They are held in this position until the bail 40 returns as hereinafter explained. On a still further movement of the actuating member 21, the bail 40 comes into contact with the springs 69, and moves the segments 63ᵃ and 63ᵇ downwardly until they occupy the positions which they occupied at first as shown in Fig. 2 and in which they are locked against upward movement by the latches 104. During the downward movement they actuate the adding wheels with which they coöperate in a direction indicated by the arrow 76ᵃ. By this means the adding wheels are rotated to register the numbers previously set up. As the actuating segment 63 of the units and tens columns move downwardly, they of course carry with them the index segments 57ᵃ and 57ᵇ to which they have been attached by the locks 72ᵃ. The index segments are released as soon as the locks 72ᵃ are forced inwardly by coming into contact with the cam surfaces 113ᵃ. At the same time they are locked in their retracted positions by the latches 73 engaging the pins 72ᵇ. The index segments are then immediately returned to their initial positions by the springs 62. Near the end of the downward stroke of the operating handle the pawl 28 of the actuating member 21 rides over the upper end of the latch 99. The downward movement of the handle lever is now completed and the return stroke is commenced. The first result of the upward movement of the handle is the tripping of the latch 99 by the pawl 28 which in this direction is set against the pin 29. Thus the frame 83 is immediately released and the adding wheels 180 are drawn out of mesh with their actuating segments by the spring 92 and are locked against accidental rotation by the bar 93 which engages the teeth of the adding wheels. No further action is accomplished by the return stroke of the handle, since the pawls 34 and 35 ride over the ends of the latches 121 and 145, until the bail 40 impinges on the cam 165 and returns the bail 160 to its normal position as shown in Figs. 1 and 2. The latches 79ᵃ are thus permitted to drop back into the apertures at the upper end of the index segments. By the operation thus described, the number "78" is printed on the paper strip and is registered on the adding wheels.

In order to explain the carrying mechanism it may be assumed that "6" is to be added in the units column. The operator proceeds as before and the operation of the mechanism is the same except that as the adding wheel 180 in the units column completes a full revolution the pin 183 which is carried by the wheel, trips the latch 95 and releases the stop lever 94 permitting it to be moved by the spring 96 until the arm 98 is displaced from its normal position a distance sufficient to permit the segment to register one more number. As already explained, the arm 98 is offset to coöperate with the pin 71 of the segment of the next higher column.

When the bail 40 completes its downward movement it compresses the spring 69 of each of the actuating segments, each segment being held by the engagement of its pin 71 with the arm 98 of the stop lever of the next lower column. Since in adding "6" to the units column the stop lever 94 has been released from its normal position, it follows that the compressed spring 69 of the tens column will force its segment downward until the pin is stopped by the arm 98 and this extra movement causes the registering of one more number on the tens adding wheel. Thus the total will read "84."

On the return stroke of the bail 40 the tension is taken off the spring 69, and the spring 75 will immediately move the segment 63ᵇ in the tens column upwardly against its latch 104. Previous to this the adding wheels have been taken out of mesh with their actuating segments as explained above. The stop lever 94 is not reset until the next downward movement of the actuating lever 21. Then pawl 31, by reason of its engagement with the shaft 90, first actuates the reset frame 100 which, as already explained, acts upon the arm 102 of the stop lever and returns it to its normal position, the further depression of the shaft 90 serving in the usual manner to oscillate the frame and to throw the adding wheels into mesh with their segments.

When the machine is used for multiplying, the number to be multiplied is first set up on the machine as already explained. The operator then presses down on the key 110 so as to throw the cams 113ᵃ out of the path of the locks 72ᵃ. Supposing the multiplier to be "3," the operator moves the handle lever through three complete strokes, releasing the key 110 however, at the beginning of the third stroke. It is evident that when the key 110 is pressed the index segments and the actuating segments which have been set remain locked and consequently it is unnecessary for the operator to repeatedly set up the number by means of a pencil or stylus, the index segment serving each time to limit the upward movement of the actuating segment, causing it to stop each time at the number originally set up.

The feeding of the paper for each successive item is effected by a ratchet and pawl 159 in a well known manner, this mechanism being actuated by the hammer actuating bail to which it is connected by a link 159ᵃ. The ribbon is also fed since it is operatively connected to the feed roll shaft on which the ratchet is mounted. In order to print the total of the sum added as a footing to the items successively printed as above explained, the operator pulls down the totalizer handle lever 44. The movement of the lever produces a downward movement of the totalizer member 41 and as a first result, the bail 90 is depressed by the pawl 49 thereby resetting, such of the stop levers 94 as may have been released in the previous operation, and throwing the adding wheels into mesh with the actuating segments.

Attention is directed to the fact that the segments are all in their normal position when the adding wheels are brought into mesh. The pin 54 next engages the arm 108 thereby releasing all of the latches 104 from the notches 107 and permitting the springs 75 to move the segments upward turning at the same time the adding wheels 180 in a reverse direction to the arrows 76ᵃ until the pins 183 strike the upper ends of the latches 95. The number now visible through the apertures 20, is zero but each wheel has moved through a distance corresponding to the number which is previously registered. The segments having moved correspondingly, the type carriers are in position to print the numbers that were on the adding wheels before they were returned to zero. Further movement of the totalizer member 41 actuates the shutter and the hammer mechanism in the same way as they were actuated by the member 21, and causes the total to be printed on the paper. Further movement of the totalizer member 41 causes pawl 48 to trip the latch 99, which is arranged to be tripped in either direction, and the spring 92 immediately swings the oscillating frame 83 and withdraws the adding wheels from mesh with the actuating gears. Attention is directed to the fact that the operation employed in printing the total also clears the machine.

The index segments may be modified as shown in Fig. 12 by making the apertures larger and preferably open at one end, and arranging the latch to protrude beyond the face of the index segment so that it will strike the operator's finger.

While I have shown a machine employing pivotally mounted index members and actuating members, my invention is not limited in this regard and these members may be made out of straight bars and have straight line movements, the actuating members would then be in the form of racks, the actuating member and the adding wheels being brought into and out of mesh in any suitable manner.

What I claim is:

1. In a calculating machine, the combination with an index member, an adding member adapted to add when moved in one direction, and means tending to move the adding member in the opposite direction, of normally retracted means for locking the members together in predetermined relations.

2. In a calculating machine, the combination with an index member, an adding member adapted to add when moved in one direction, and means tending to move the adding member in the opposite direction, of a locking pawl carried by the adding member and adapted when released to lock the said members together in one of a series of positions corresponding to numeral digits.

3. In a calculating machine, the combination with an index member, an adding member adapted to add when moved in one direction, and means tending to move the adding member in the opposite direction, of a locking pawl carried by the adding member and adapted when released to lock the said members together in one of a series of positions corresponding to numeral digits; and a latch for holding the locking pawl in a retracted position.

4. In a calculating machine, the combination with an index member having a series of numeral digits indicating stations thereon, an adding member adapted to add when moved in one direction but biased to move in the opposite direction, of normally retracted means for locking the members together, and means for holding the adding member in a zero position, said normally retracted means being adapted to be released by an object inserted in the machine at one of said stations of the index member to lock said members together.

5. In a calculating machine, the combination with an index member having a series of openings corresponding to numeral digits, an adding member adapted to add when moved in one direction, and means tending to move the adding member in the opposite direction, of normally retracted means for locking the members together.

6. In a calculating machine, the combination with an index member having a series of openings corresponding to numeral digits, an adding member adapted to add when moved in one direction, and means tending to move the adding member in the opposite direction, of normally retracted means for locking the members together, said index member being adapted to have an object inserted in one of its openings to release the retracted locking means to lock the adding member in a position corresponding to the digit represented by the opening in which the object is inserted.

7. In a calculating machine, the combination with an index member having a series of apertures corresponding to the numeral digits, an adding member adapted to add when moved in one direction, and means tending to move the adding member in the opposite direction, of a locking pawl carried by the adding member and adapted when released to engage one of the index member apertures, and a latch for holding the locking pawl in a retracted position.

8. In a calculating machine, the combination with an index segment having a series of apertures corresponding to the numeral digits, an adding segment adapted to add when moved in one direction, and a spring tending to move the adding segment in the opposite direction, of a locking pawl carried by the adding segment and adapted when released to engage one of the index segment apertures, and a latch for holding the locking pawl in a retracted position.

9. In a calculating machine, the combination with an index member having a series of apertures corresponding to the numeral digits, an adding member adapted to add when moved in one direction, and means tending to move the adding member in the opposite direction, of a locking pawl carried by the adding member and adapted when released to engage one of the index member apertures, and a latch for holding the locking pawl in a retracted position, said index member being adapted to have an object inserted in one of its apertures to trip the latch and lock the adding member in a position corresponding to the digit represented by the aperture in which the object is inserted.

10. In a calculating machine, the combination with an index segment having a series of apertures corresponding to the numeral digits, an adding segment adapted to add when moved in one direction, and means tending to move the adding segment in the opposite direction, of a locking pawl carried by the adding segment and adapted when released to engage one of the index segment apertures, and a latch for holding the locking pawl in a retracted position, said index segment being adapted to have an object inserted in one of its apertures to trip the latch and lock the adding segment in a position corresponding to the digit represented by the aperture in which the object is inserted.

11. In a calculating machine, the combination with an index member having a series of openings corresponding to numeral digits, an adding member adapted to add when moved in one direction, and means tending to move the adding member in the opposite direction, of means for holding the adding member in a zero position; and normally retracted means for locking the members together.

12. In a calculating machine, the combination with an index member having a series of openings corresponding to numeral digits, an adding member adapted to add when moved in one direction, and means tending to move the adding member in the opposite direction, of means for holding the adding member in a zero position; and normally retracted means for locking the members together, said index member being adapted to have an object inserted in one of its openings and to be moved slightly thereby in one direction to release the adding member, and to release the locking means to lock the adding member to the index member in a position corresponding to the number represented by the opening in which the object is inserted.

13. In a calculating machine, the combination with an index member having a series of apertures corresponding to numeral digits, an adding member adapted to add when moved in one direction, means tending to move the adding member in the opposite direction, and a latch for holding the adding member in a zero position, of a locking pawl carried by the adding member and adapted when released to engage one of the apertures of the index member, and a latch for holding the locking pawl in a retracted position, said index member being adapted to have an object inserted in one of its apertures and to be moved slightly thereby in one direction to release the latch holding the adding member, thereby permitting a movement thereof, and to release the latch permitting the locking pawl to lock the adding member to the index member in a position corresponding to the number represented by the aperture in which the object is inserted.

14. In a calculating machine, the combination with an index segment having a series of apertures corresponding to the numeral digits, an adding segment adapted to add when moved in one direction and a spring tending to move the adding segment in the opposite direction, of a latch for holding the adding segment in a zero position, a locking pawl carried by the adding segment and adapted when released to engage one of the index segment apertures, and a latch for holding the locking pawl in a retracted position, said index member being adapted to have an object inserted in one of its apertures and to be moved slightly thereby in one direction to release the latch holding the adding member, thereby permitting a non-adding movement of the adding segment, said movement being limited by the engagement with and release of the latch holding the locking pawl by said inserted object.

15. In a calculating machine, the combination with an index segment having a plurality of openings corresponding to a set of numeral digits, means tending to hold it in its normal position, an adding segment adjacent thereto biased to move in a non-adding direction, and a latch for holding the adding segment in a zero position, of normally retracted means for locking the adding segment to the index segment, said index segment being adapted to be slightly moved by an object inserted in one of said openings to release said normally retracted means when the adding segment has moved to a position corresponding to the digit of the opening in which the object is inserted.

16. In a calculating machine, the combination with an index segment having a plurality of apertures corresponding to the numeral digits, and a lateral projection near one end, a latch for limiting the movement of the index segment from its normal position, an adding segment, a latch for holding the adding segment in a zero position, and springs tending respectively to hold the index segment in its normal position and to move the adding segment in a non-adding direction, of a locking pawl carried by the adding segment and adapted when released to engage one of the apertures of the index segment; and a latch for holding the locking pawl in a retracted position.

17. In a calculating machine, the combination with an index segment having a plurality of apertures corresponding to the numeral digits, and a lateral projection near one end, a latch for limiting the movement of the index segment from its normal position, an adding segment, a latch for holding the adding segment in a zero position, and springs tending respectively to hold the index segment in its normal position and to move the adding segment in a non-adding direction, of a locking pawl carried by the adding segment and adapted when released to engage one of the apertures of the index segment; and a latch for holding the locking pawl in a retracted position, said index segment being adapted to have an object inserted in one of its apertures and to be moved slightly thereby in one direction whereby the lateral projection of the index segment trips the latch for holding the adding segment, said inserted object being adapted to engage and to release the latch for holding the locking pawl when the adding segment has moved to a position corresponding to the digit represented by the aperture in which the object was inserted, said adding segment being locked in such position by the locking pawl.

18. In a calculating machine, the combination with a plurality of index members each having a series of openings corresponding to numeral digits, a plurality of adding members adapted to add when moved in one direction, and means tending to move the adding members in the opposite direction, of normally retracted means for locking each adding member to a corresponding index member, and means for simultaneously releasing the members from each other.

19. A plurality of index members each having a series of openings corresponding to numeral digits, a plurality of adding members adapted to add when moved in one direction, and means tending to move the adding members in the opposite direction, of normally retracted means for locking each adding member to a corresponding index member, means for simultaneously releasing the members from each other, and a repeater key for rendering said releasing means inoperative.

20. In a calculating machine, the combination with a plurality of index segments each having a series of apertures corresponding to numeral digits, a plurality of adding segments adapted to add when moved in one direction and springs tending to move the adding segments in the opposite direction, of a locking pawl carried by each adding segment and adapted when released to engage one of the apertures of the corresponding index segment, means for concurrently releasing all of the locking pawls, and a repeater key for rendering said releasing means inoperative.

21. In a calculating machine, in combination a plurality of index segments each having a series of openings corresponding to a set of numeral digits, a spring tending to hold each index segment in its normal position, an adding segment adjacent to each index segment and biased to move in a nonadding direction, a latch for holding each segment in a zero position, and means for holding each adding segment to its corresponding index segment, said index and adding segments being adapted to be moved together for multiplying.

22. In a calculating machine, in combination a plurality of index segments each having a series of openings corresponding to a set of numeral digets, a spring tending to hold each index segment in its normal position, an adding segment adjacent to each index segment and biased to move in a nonadding direction, a latch for holding each segment in a zero position, a normally retracted means for holding each adding segment to its corresponding index segment, means for concurrently releasing the index segments from the adding segments, and a repeater key for rendering said means inoperative.

23. In a calculating machine, in combination a plurality of index members, an adding member corresponding to each index member, means between each pair of members for limiting the movement of the adding member relative to the corresponding index member, means for actuating all of the adding members, means for concurrently releasing the index members from the adding members, and a repeater key for rendering said last-named means inoperative.

24. In a calculating machine, in combination a plurality of index members, an adding member corresponding to each index member, means between each pair of members for limiting the movement of the adding member relative to the corresponding index member, means for actuating all of the adding members, means for concurrently releasing the index members from the adding members, and a repeater key for rendering said last-named means inoperative, whereby the index members are free to be moved repeatedly with the adding members for multiplying.

25. In a calculating machine, in combination, an index member, an adding member adapted to add when moved in one direction, a locking pawl carried by the adding member and adapted when released to lock the said members together in one of a series of positions corresponding to numeral digits; and a latch for holding the locking pawl in a retracted position.

26. In a calculating machine, in combination a plurality of index members, an adding member corresponding to each index member, means between each pair of members for holding them together in predetermined operative positions relative to each other, means for actuating the members when in their locked relations, means for releasing the members from each other, and means for rendering the last-named means inoperative.

In witness whereof, I have hereunto set my hand in the presence of two subscribing witnesses, this 18th day of February, 1914.

WILLIAM P. QUENTELL.

Witnesses:
R. J. DEARBORN,
F. GRAVES.

Copies of this patent may be obtained for five cents each, by addressing the "Commissioner of Patents, Washington, D. C."